United States Patent
Ergen et al.

(10) Patent No.: US 11,419,165 B2
(45) Date of Patent: Aug. 16, 2022

(54) METHOD AND SYSTEM FOR ESTABLISHING A CONNECTION BETWEEN A CLIENT DEVICE AND A WI-FI ACCESS POINT USING A CLOUD PLATFORM

(71) Applicant: Ambeent Wireless Bilişim ve Yazilim A.Ş, Istanbul (TR)

(72) Inventors: Mustafa Ergen, Istanbul (TR); Hasan Şildir, Istanbul (TR); Sinem çöleri Ergen, Istanbul (TR)

(73) Assignee: Ambeent Inc., Istanbul (TR)

( * ) Notice: Subject to any disclaimer, the term of this patent is extended or adjusted under 35 U.S.C. 154(b) by 0 days.

(21) Appl. No.: 15/854,733

(22) Filed: Dec. 26, 2017

(65) Prior Publication Data

US 2022/0174755 A1    Jun. 2, 2022

Related U.S. Application Data

(60) Provisional application No. 62/498,379, filed on Dec. 27, 2016.

(51) Int. Cl.
*H04W 76/11* (2018.01)
*H04W 12/73* (2021.01)
(Continued)

(52) U.S. Cl.
CPC ............ *H04W 76/11* (2018.02); *H04W 12/06* (2013.01); *H04W 12/73* (2021.01); *H04W 48/10* (2013.01)

(58) Field of Classification Search
CPC ..... H04W 4/023; H04W 4/025; H04W 4/029; H04W 4/33; H04W 4/046; H04W 4/24; H04W 8/186; H04W 12/06; H04W 12/08; H04W 24/02; H04W 24/08; H04W 40/20; H04W 64/00; H04W 80/04; H04W 84/12; H04W 84/18; H04W 88/02; H04W 88/04; H04W 88/08; H04W 12/73; H04W 48/10; H04W 76/11; H04M 15/8055;
(Continued)

(56) References Cited

U.S. PATENT DOCUMENTS

8,893,246 B2 * 11/2014 Jover Segura ........ H04L 63/101
 713/168
10,609,633 B2 * 3/2020 Zhu ........................ H04W 48/08
(Continued)

*Primary Examiner* — Jean A Gelin
(74) *Attorney, Agent, or Firm* — Farrell Patent Law PC; Mark Farrell (57) ABSTRACT

The invention provides a method and system for establishing a connection between a client device of a plurality of client devices and a Wi-Fi access point of a plurality of Wi-Fi access points using a cloud platform. In an embodiment, the cloud platform identifies one or more target Wi-Fi access points and transmits an SSID-password tuple associated with the client device to the one or more target Wi-Fi access points. The one or more target Wi-Fi access points, then, broadcast an SSID of the client device and upon detecting the broadcast, the client device selects a target Wi-Fi access point and transmits a message with a pre-stored SSID-password tuple to the target Wi-Fi access point. Thereafter, the target Wi-Fi access point authorizes the client device to access the target Wi-Fi access point based on a comparison of the pre-stored SSID-password tuple and the SSID-password tuple received from the cloud platform.

18 Claims, 10 Drawing Sheets

(51) Int. Cl.
*H04W 12/06* (2021.01)
*H04W 48/10* (2009.01)

(58) Field of Classification Search
CPC ......... H04M 15/8083; H04M 15/8214; H04M 15/8228; H04M 15/93
See application file for complete search history.

(56) References Cited

U.S. PATENT DOCUMENTS

| | | | |
|---|---|---|---|
| 2013/0203036 A1* | 8/2013 | Jabara ..................... | H04L 67/10 434/350 |
| 2013/0333016 A1* | 12/2013 | Coughlin .............. | H04L 63/083 709/227 |
| 2016/0286457 A1* | 9/2016 | O'hare .................. | H04W 4/025 |
| 2019/0174011 A1* | 6/2019 | Jabara ..................... | H04W 4/24 |

* cited by examiner

METHOD AND SYSTEM FOR ESTABLISHING A CONNECTION BETWEEN A CLIENT DEVICE AND A WI-FI ACCESS POINT USING A CLOUD PLATFORM

FIELD OF THE INVENTION

The invention generally relates to establishing a connection between a client device of a plurality of client devices and a Wi-Fi access point of a plurality of Wi-Fi access points using a cloud platform. More specifically, the invention relates to authorizing the client device to access the Wi-Fi access point using an SSID-password tuple associated with the client device, wherein the SSID-password tuple is stored on the cloud platform.

BACKGROUND OF THE INVENTION

Wi-Fi networks are formed using one or more Wi-Fi access points that support a connection of multiple wireless client devices to a wired connection for access to the Internet. Due to huge demand, enormous number of Wi-Fi access points are deployed in places such as, but not limited to, residential spaces, apartments, office buildings and public spaces and the Wi-Fi access points are densely concentrated around certain places with high data traffic.

Wi-Fi network access points send beacons at defined intervals that are then detected by client devices. Most Wi-Fi access points allow the changing of the beacon interval and increasing the beacon interval causes the beacons to be sent less frequently. This reduces load on the network and increases throughput for clients on the network however, it has the undesirable effect of delaying association and roaming processes as client devices scanning for access points could potentially miss a beacon while scanning other channels. Alternatively, decreasing the beacon interval causes beacons to be sent more frequently which increases load on the network and decreases throughput for users. An additional downside of decreasing the beacon interval is that client devices in power save mode, consume more power as the client devices must more frequently awake to receive beacons.

Each client device is identified by a service set identifier (SSID) which is used as an identifier for a wireless LAN, using which a connection is established between the client device and the Wi-Fi access point. As a purported security enhancement, some Wi-Fi access points allow client devices to inhibit the broadcasting of their SSIDs, known as network cloaking and a client device is able to access a Wi-Fi access point after the client device's associated SSID has been specified explicitly. This technique acts as a deterrent to the extent that it impedes casual wireless snooping but is not effective against widely available network scanners. Furthermore, the technique of SSID-hiding forces wireless clients to probe for SSIDs everywhere they go, which makes them vulnerable to attackers who emulate the probed network.

Further, existing systems have a client-centric mechanism for authenticating a client device to access a Wi-Fi access point. This means that the client device stores all the tuples (SSID-password pairs) and searches for the appropriate tuple when connecting to the Wi-Fi access point. As a result, the client device has to search for the Wi-Fi access point that the client device can connect to, and performs an internal sorting to find out whether the Wi-Fi access points that were sniffed are in the list. This technique is a very time consuming process.

Therefore, in light of the above, there is a need for a method and system for providing faster, seamless connection and roaming, and authentication of client devices to a Wi-Fi based network architecture.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to establishing a connection between a client device of a plurality of client devices and a Wi-Fi access point of a plurality of Wi-Fi access points using a cloud platform.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for establishing a connection between a client device of a plurality of client devices and a Wi-Fi access point of a plurality of Wi-Fi access points using a cloud platform. In an embodiment, in order to establish a connection between a client device and a Wi-Fi access point, the cloud platform identifies one or more target Wi-Fi access points of the plurality of Wi-Fi access points. Subsequently, the cloud platform transmits an SSID-password tuple associated with the client device to the one or more target Wi-Fi access points. In an ensuing step, the one or more target Wi-Fi access points broadcast an SSID of the client device. The client device, upon detecting the broadcast from the one or more target Wi-Fi access points, selects a target Wi-Fi access point from the one or more target Wi-Fi access points. The client device, then, transmits a message to the target Wi-Fi access point, wherein the message comprises a pre-stored SSID-password tuple. Thereafter, the target Wi-Fi access point authorizes the client device to access the target Wi-Fi access point based on a comparison of the pre-stored SSID-password tuple received from the client device and the SSID-password tuple received from the cloud platform.

In another embodiment, in order to establish a connection between one or more client devices of a plurality of client devices and a Wi-Fi access point of a plurality of Wi-Fi access points, the Wi-Fi access point identifies one or more client devices, wherein each client device of the one or more client devices is associated with a MAC address. The Wi-Fi access point transmits the MAC address corresponding to each client device of the one or more client devices to the cloud platform. Upon receiving the MAC address corresponding to the one or more client devices, the cloud platform transmits an SSID-password tuple corresponding to each client device of the one or more client devices to the Wi-Fi access point. In an ensuing step, the Wi-Fi access point broadcasts an SSID corresponding to each client device of the one or more client devices. On receiving the broadcast, the one or more client devices select the Wi-Fi access point and transmit a message to the Wi-Fi access point, wherein the message comprises a pre-stored SSID-password tuple. Thereafter, the Wi-Fi point authorizes the one or more client devices to access the Wi-Fi access point based on a comparison of the pre-stored SSID-password tuple received from the corresponding one or more client devices and the SSID-password tuple corresponding to the one or more client devices received from the cloud platform.

Figure 1:
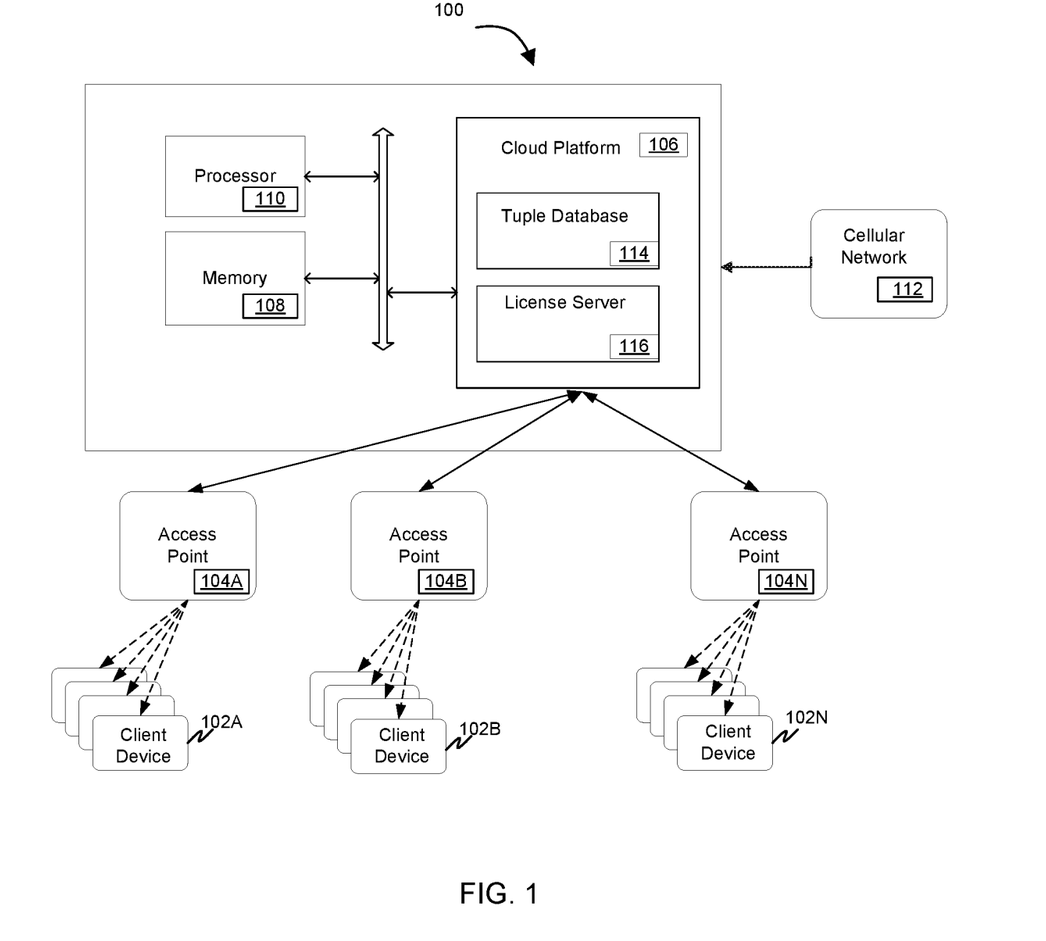
FIG. 1 illustrates a system for establishing a connection between a client device of a plurality of client devices and a Wi-Fi access point of a plurality of Wi-Fi access points using a cloud platform in accordance with an embodiment of the invention, wherein the cloud platform identifies one or more target Wi-Fi access points of the plurality of Wi-Fi access points for establishing the connection.

FIG. 1 illustrates a system 100 for establishing a connection between a client device 102A of a plurality of client devices 102A-102N and a Wi-Fi access point 104A of a plurality of Wi-Fi access points 104A-104N using a cloud platform 106 in accordance with an embodiment of the invention, wherein cloud platform 106 identifies one or more target Wi-Fi access points of plurality of Wi-Fi access points 104A-104N for establishing the connection.

As illustrated in FIG. 1, system 100 includes a memory 108 and a processor 110 communicatively coupled to memory 108. Cloud platform 106 is communicatively coupled to memory 108 and processor 110.

Cloud platform 106 communicates with plurality of client devices 102A-102N and plurality of Wi-Fi access points 104A-104N. Plurality of client devices 102A-102N are user devices such as, but not limited to, a mobile device, a personal digital assistant, a computer, a laptop, a smart phone and a tablet. Plurality of Wi-Fi access points 104A-104N are deployed in places such as, but not limited to, homes, enterprises and public spaces.

In order to establish a connection between client device 102A and one Wi-Fi access point of plurality of Wi-Fi access points 104A-104N, cloud platform 106 identifies one or more target Wi-Fi access points of plurality of Wi-Fi access points 104A-104N.

In accordance with an embodiment, in order to identify the one or more target Wi-Fi access points at cloud platform 106, cloud platform 106 detects a location associated with client device 102A and a location associated with each Wi-Fi access point of plurality of Wi-Fi access points 104A-104N utilizing a cellular network 112.

Cellular network 112 detects the location of client device 102A through a base station or other means. Further, cellular network 112 detects the location of one or more Wi-Fi access points in vicinity of client device 102A and signals cloud platform 106 to push the SSID-password tuple associated with client device 102A to the one or more Wi-Fi access points of plurality of Wi-Fi access points 104A-104N in the vicinity of client device 102A.

In accordance with another embodiment, in order to identify the one or more target Wi-Fi access points at cloud platform 106, client device 102A broadcasts a probe request message to one or more Wi-Fi access points of plurality of Wi-Fi access points 104A-104N, wherein the probe request message includes the MAC address of client device 102A. On receiving the probe request message at the one or more Wi-Fi access points, the one or more Wi-Fi access points transmit a message to cloud platform 106, wherein the message includes the MAC address of client device 102A.

Upon receiving the MAC address of client device 102A from the one or more Wi-Fi access points, cloud platform 106 identifies a MAC address corresponding to each Wi-Fi access point of the one or more Wi-Fi access points, thus identifying the one or more target Wi-Fi access points. Furthermore, the one or more Wi-Fi access points can transmit a plurality of MAC addresses associated with a client device family, wherein a family of a client device is predetermined.

Once the one or more target Wi-Fi access points are identified, cloud platform 106 accesses a tuple database 114 present on cloud platform 106 and retrieves an SSID-password tuple associated with client device 102A.

Tuple database 114 stores a plurality of MAC addresses and a plurality of SSID-password tuples associated with plurality of client devices 102A-102N. Each client device of plurality of client devices 102A-102N is associated with a corresponding MAC address. Also, a unique SSID-password tuple is stored in tuple database 114 for each of the MAC addresses. In certain embodiments, tuple database 114 stores a plurality of MAC addresses corresponding to a family of client devices, wherein the family of client devices are associated with a single SSID-password tuple.

Once the SSID-password tuple associated with client device 102A is retrieved from tuple database 114, cloud platform 106 transmits the SSID-password tuple associated with client device 102A to the one or more target Wi-Fi access points identified at cloud platform 106.

Prior to transmitting the SSID-password tuple to the one or more target Wi-Fi access points, cloud platform 106 checks a license server 116 for a license associated with client device 102A. License server 116 may be present on cloud platform 106. If a license is present for client device 102A on license server, client device 102A is authorized and cloud platform 106 transmits the SSID-password tuple associated with client device 102A to the one or more target Wi-Fi access points. On the other hand, if client device 102A does not have a license, the one or more target Wi-Fi access points transmit a rejection message to client device 102A, thus denying access of client device 102A to the one or more target Wi-Fi access points.

Moving on, upon receiving the SSID-password tuple associated with client device 102A, the one or more target Wi-Fi access points broadcast the SSID associated with client device 102A. In an embodiment, the SSID broadcast by the one or more target Wi-Fi access points is an Open SSID.

Client device 102A, upon detecting the broadcast, selects a target Wi-Fi-access point 104A of the one or more target Wi-Fi access points for establishing the connection. Client device 102A, then, transmits a message to the selected target Wi-Fi access point 104A, wherein the message includes a pre-stored SSID-password tuple. The pre-stored SSID-password tuple is the SSID-password tuple stored on client device 102A. Target Wi-Fi access point 104A, upon receiving the message from client device 102A, authorizes client device 102A to access target Wi-Fi access point 104A based on a comparison of the pre-stored SSID-password tuple received from client device 102A and the SSID-password tuple received from cloud platform 106. The pre-stored SSID-password tuple received from client device 102A is compared to the SSID-password tuple received from cloud platform 106 at target Wi-Fi access point 104A. Based on the comparison, if the pre-stored SSID-password tuple on client device 102A and the SSID-password tuple received from cloud platform 106 match, client device 102A is authorized to access target Wi-Fi access point 104A.

Figure 2:
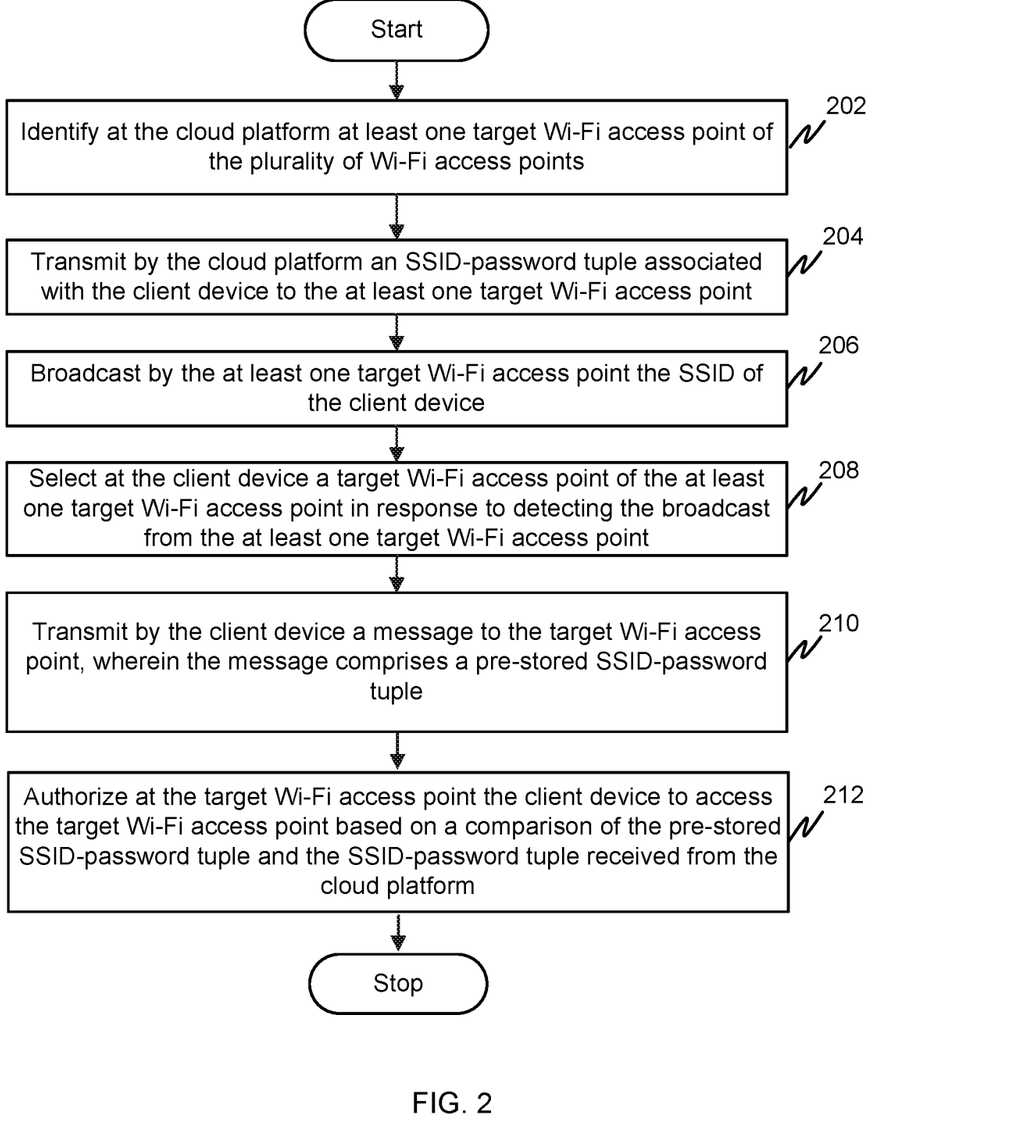
FIG. 2 illustrates a flowchart of a method for establishing a connection between a client device of a plurality of client devices and a Wi-Fi access point of a plurality of Wi-Fi access points using a cloud platform in accordance with an embodiment of the invention.

FIG. 2 illustrates a flowchart of a method for establishing a connection between client device 102A of plurality of client devices 102A-102N and Wi-Fi access point 104A of plurality of Wi-Fi access points 104A-104N using cloud platform 106 in accordance with an embodiment of the invention.

At step 202, in order to establish a connection between client device 102A and one Wi-Fi access point of plurality of Wi-Fi access points 104A-104N, cloud platform 106 identifies one or more target Wi-Fi access points of plurality of Wi-Fi access points 104A-104N. Step 202 is further described in detail in conjunction with FIGS. 3 and 4.

Once the one or more target Wi-Fi access points are identified, cloud platform 106 accesses tuple database 114 to retrieve the SSID-password tuple associated with client device 102A and at step 204, transmits the SSID-password tuple associated with client device 102A to the one or more target Wi-Fi access points. Tuple database 114 includes a plurality of MAC addresses and a plurality of SSID-password tuples associated with plurality of client devices 102A-102N. Each MAC address of the plurality of MAC addresses is associated with a unique SSID-password tuple. Step 204 is further described in detail in conjunction with FIG. 5.

In an ensuing step 206, the one or more target Wi-Fi access points broadcast the SSID of client device 102A. The SSID broadcast by the one or more target Wi-Fi access points may be an Open SSID.

At step 208, upon detecting the SSID broadcast by the one or more target Wi-Fi access points, client device 102A selects target Wi-Fi access point 104A from the one or more target Wi-Fi access points.

Subsequently, at step 210, client device 102A transmits a message to target Wi-Fi access point 104A, wherein the message includes a pre-stored SSID-password tuple.

Thereafter, at step 212, target Wi-Fi access point 104A authorizes client device 102A to access target Wi-Fi access point 104A based on comparing the pre-stored SSID-password tuple received from client device 102A and the SSID-password tuple received from cloud platform 106. The pre-stored SSID-password tuple received from client device 102A is compared to the SSID-password tuple received from cloud platform 106 at target Wi-Fi access point 104A. Based on the comparison, if the pre-stored SSID-password tuple on client device 102A and the SSID-password tuple received from cloud platform 106 match, client device 102A is authorized to access target Wi-Fi access point 104A.

Figure 3:
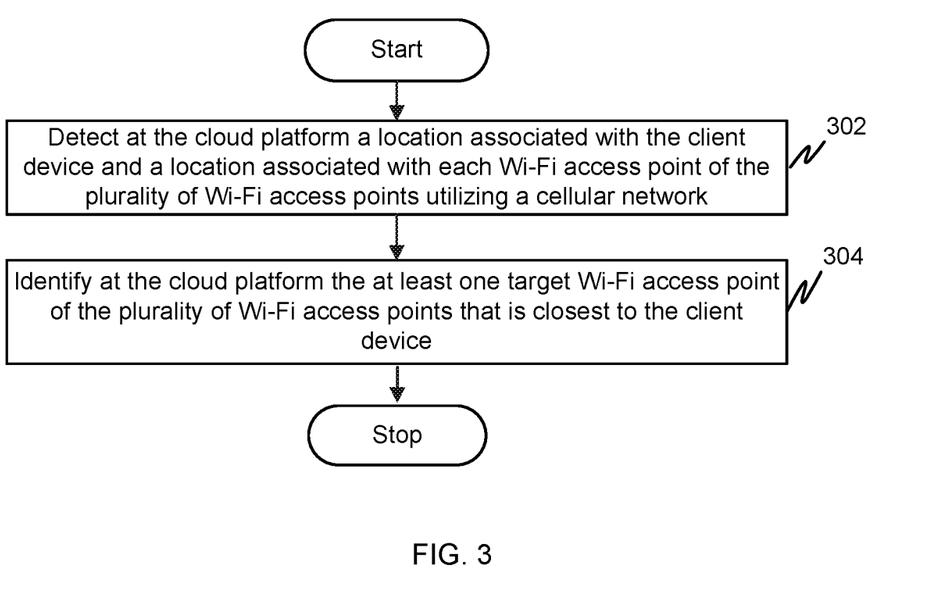
FIG. 3 illustrates a flowchart of a method for identifying one or more target Wi-Fi access points at the cloud platform using a cellular network in accordance with an embodiment of the invention.

FIG. 3 illustrates a flowchart of a method for identifying the one or more target Wi-Fi access points at cloud platform 106 using cellular network 112 in accordance with an embodiment of the invention.

At step 302, cloud platform 106 detects a location associated with client device 102A and a location associated with each Wi-Fi access point of plurality of Wi-Fi access points 104A-104N utilizing cellular network 112. Cellular network 112 detects the location of client device 102A through a base station or other means.

Cellular network 112 detects the location of Wi-Fi access points in vicinity of client device 102A. Thereafter, at step 304, cloud platform 106 identifies one or more target Wi-Fi access points that are closest to client device 102A.

Further, cellular network 112 signals cloud platform 106 to push the SSID-password tuple associated with client device 102A to the one or more target Wi-Fi access points in the vicinity of client device 102A.

Figure 4:
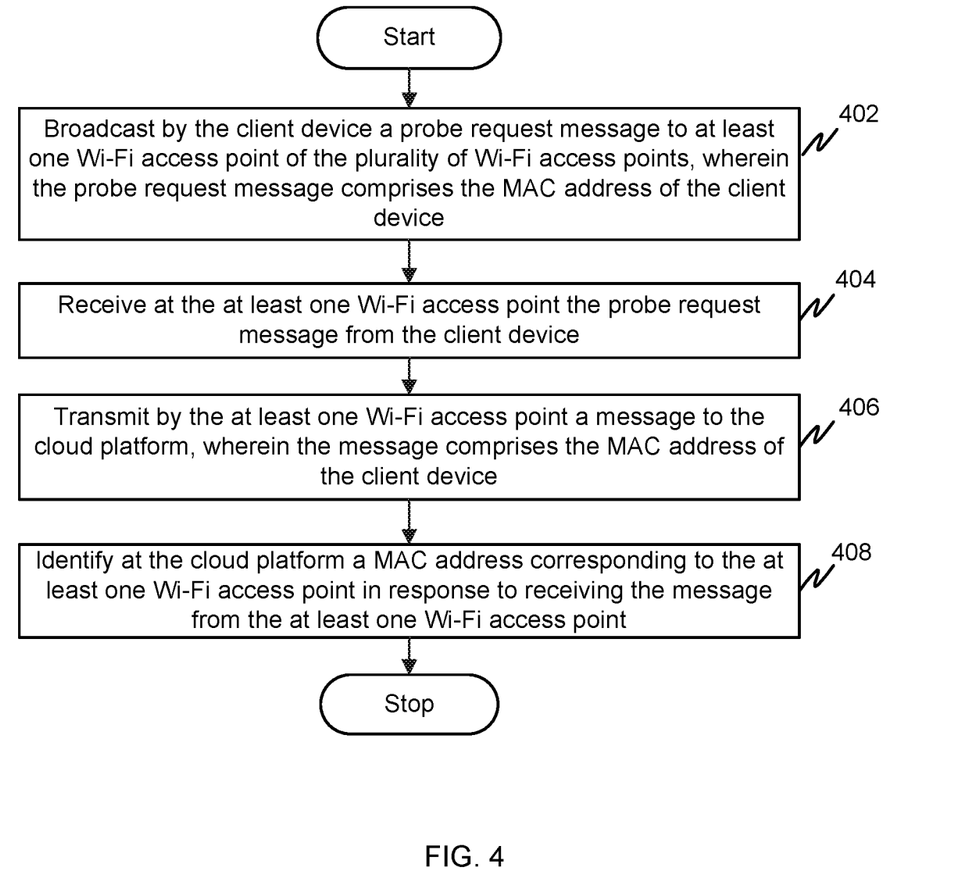
FIG. 4 illustrates a flowchart of a method for identifying one or more target Wi-Fi access points at the cloud platform using MAC address corresponding to the one or more target Wi-Fi access points in accordance with an embodiment of the invention.

FIG. 4 illustrates a flowchart of a method for identifying the one or more target Wi-Fi access points at cloud platform 106 using MAC address corresponding to the one or more target Wi-Fi access points in accordance with an embodiment of the invention.

At step 402, client device 102A broadcasts a probe request message to one or more Wi-Fi access points of plurality of Wi-Fi access points 104A-104N, wherein the probe request message includes the MAC address of client device 102A.

At step 404, the one or more Wi-Fi access points receive the probe request message broadcast by client device 102A.

Subsequently, in response to receiving the probe request message, at step 406, the one or more Wi-Fi access points transmit a message to cloud platform 106, wherein the message includes the MAC address of client device 102A.

Thereafter, at step 408, in response to receiving the message from the one or more Wi-Fi access points, cloud platform 106 identifies a MAC address corresponding to each Wi-Fi access point of the one or more Wi-Fi access points and identifies the one or more target Wi-Fi access points. The one or more Wi-Fi access points can also transmit a plurality of MAC addresses associated with a client device family, wherein a family of a client device is predetermined.

Figure 5:
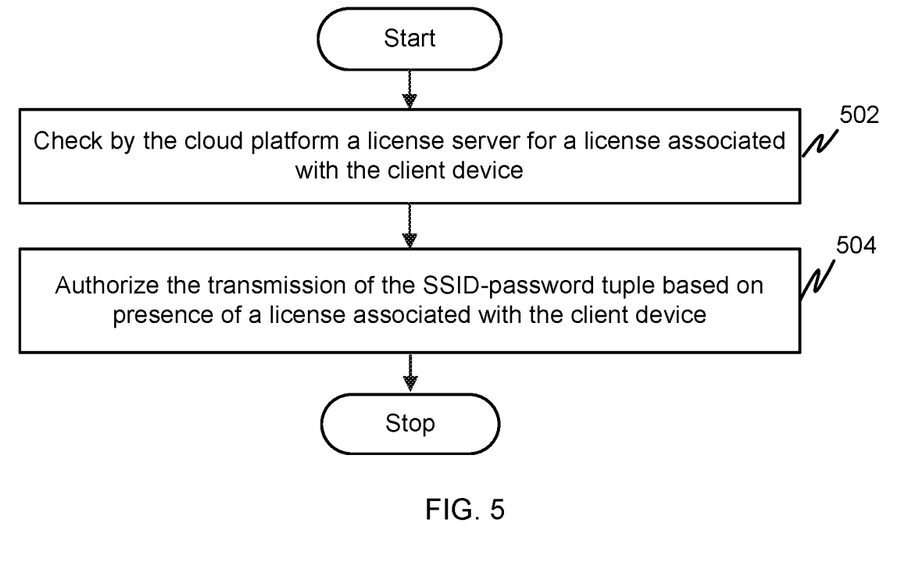
FIG. 5 illustrates a flowchart of a method for authorizing transmission of an SSID-password tuple associated with a client device from the cloud platform to one or more target Wi-Fi access points using a license server in accordance with an embodiment of the invention.

FIG. 5 illustrates a flowchart of a method for authorizing the transmission of the SSID-password tuple associated with client device 102A from cloud platform 106 to the one or more target Wi-Fi access points using license server 116 in accordance with an embodiment of the invention.

Prior to transmitting the SSID-password tuple associated with client device 102A to the one or more target Wi-Fi access points, at step 502, cloud platform 106 checks license server 116 for a license associated with client device 102A.

Thereafter, at step 504, the transmission of the SSID-password tuple associated with client device 102A is authorized in response to determining that client device 102A has a license. Further, the one or more target Wi-Fi access points transmit a rejection message to client device 102A if client device 102A does not have a license.

Figure 6:
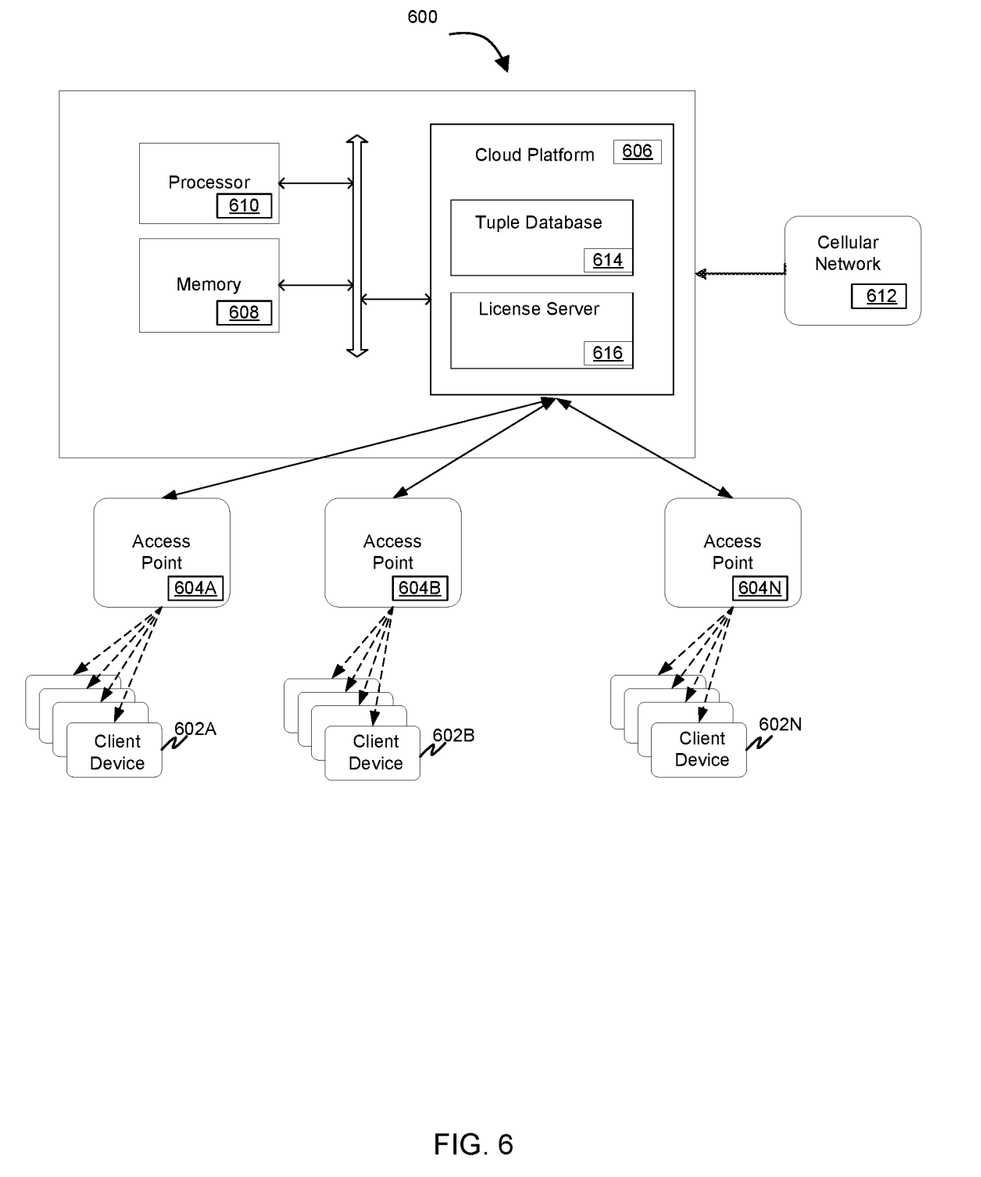
FIG. 6 illustrates a system for establishing a connection between one or more client devices of a plurality of client devices and a Wi-Fi access point of a plurality of Wi-Fi access points using a cloud platform in accordance with another embodiment of the invention, wherein the Wi-Fi access point identifies the one or more client devices for establishing the connection.

FIG. 6 illustrates a system 600 for establishing a connection between one or more client devices of plurality of client devices 602A-602N and a Wi-Fi access point 604A using a cloud platform 606 in accordance with another embodiment of the invention, wherein Wi-Fi access point 604A identifies the one or more client devices for establishing the connection.

As illustrated in FIG. 6, system 600 includes a memory 608 and a processor 610 communicatively coupled to memory 608. Cloud platform 606 is communicatively coupled to memory 108 and processor 110.

Cloud platform 606 communicates with plurality of client devices 602A-602N and plurality of Wi-Fi access points 604A-604N. Plurality of client devices 602A-602N are user devices such as, but not limited to, a mobile device, a personal digital assistant, a computer, a laptop, a smart phone and a tablet. Plurality of Wi-Fi access points 604A-604N are deployed in places such as, but not limited to, homes, enterprises and public spaces.

In order to establish a connection between one or more client devices of plurality of client devices 602A-602N and Wi-Fi access point 604A, Wi-Fi access point 604A identifies the one or more client devices.

In accordance with an embodiment, in order to identify the one or more client devices at Wi-Fi access point 604A, Wi-Fi access point 604A detects a location associated with each client device of plurality of client devices 602A-602N utilizing cellular network 612.

Cellular network 612 detects the location of each client device of plurality of client devices 602A-602N through a base station or other means. Cellular network 612, then, identifies one or more client devices of plurality of client devices 602A-602N that are closest to Wi-Fi access point 604A and signals Wi-Fi access point 604A to transmit a MAC address corresponding to the one or more client devices to cloud platform 606.

In accordance with another embodiment, in order to identify the one or more client devices at Wi-Fi access point 604A, one or more client devices of plurality of client devices 602A-602N broadcast a probe request message to Wi-Fi access point 104A, wherein the probe request message comprises the MAC address corresponding to the one or more client devices. On receiving the probe request message, Wi-Fi access point 604A identifies the MAC address corresponding to the one or more client devices.

Once the one or more client devices and the corresponding MAC addresses are identified at Wi-Fi access point 604A, Wi-Fi access point 604A transmits the MAC address corresponding to the one or more client devices to cloud platform 606.

Cloud platform 606, upon receiving the MAC address, accesses tuple database 614 and retrieves an SSID-password tuple associated with each client device of the one or more client devices.

Tuple database 614 stores a plurality of MAC addresses and a plurality of SSID-password tuples associated with the plurality of client devices, wherein each client device is associated with a MAC address. Further, tuple database 614 stores a plurality of MAC addresses corresponding to a family of client devices, wherein the family of client devices are associated with a single SSID-password tuple.

In an embodiment, each MAC address is associated with a unique SSID-password tuple. In another embodiment, a plurality of MAC addresses are associated with a common SSID and a unique password is associated with each MAC address of the plurality of MAC addresses (common SSID-unique password tuple). In yet another embodiment, a plurality of MAC addresses are associated with a common SSID and a common password (common SSID-common password tuple).

Once the SSID-password tuple associated with each client device of the one or more client devices is retrieved from tuple database 614, cloud platform 606 transmits the SSID-password tuple associated with each client device of the one or more client devices to Wi-Fi access point 604A.

Prior to transmitting the SSID-password tuple to Wi-Fi access point 604A, cloud platform 606 checks license server 616 for a license associated with the one or more client devices. If a license is present for the one or more client devices on license server 616, the one or more client devices are authorized and cloud platform 606 transmits the SSID-password tuple corresponding to each client device of the one or more client devices to Wi-Fi access point 604A. On the other hand, if the one or more client devices do not have a license, Wi-Fi access point 604A transmits a rejection message to the one or more client devices, thus denying access for the one or more client devices to Wi-Fi access point 604A.

Moving on, upon receiving the SSID-password tuple, Wi-Fi access point 604A broadcasts an SSID corresponding to each client device of the one or more client devices. In an embodiment, the SSID broadcast by Wi-Fi access point 604A is an Open SSID.

The one or more client devices, upon detecting the broadcast, select the Wi-Fi-access point 604A for establishing the connection. The one or more client devices, then, transmit a message to Wi-Fi access point 604A, wherein the message includes a pre-stored SSID-password tuple. Each client device of the one or more client devices has a corresponding pre-stored SSID-password tuple. Upon receiving the message from the one or more client devices, Wi-Fi access point 604A authorizes the one or more client devices to access Wi-Fi access point 604A based on a comparison of the pre-stored SSID-password tuple received from the corresponding one or more client devices and the SSID-password tuple corresponding to the one or more client devices received from cloud platform 606.

Wi-Fi access point 604A compares the pre-stored SSID-password tuple to the SSID-password tuple received from cloud platform 606. Based on the comparison, if the pre-stored SSID-password tuple and the SSID-password tuples received from cloud platform 606 match, the one or more client devices are authorized to access Wi-Fi access point 604A.

In an embodiment, if the SSID-password tuple corresponding to the one or more client devices received from cloud platform 606 is a common SSID-unique password tuple, Wi-Fi access point 604A authorizes the one or more client devices to access Wi-Fi access point 604A based on the unique password associated with the one or more client devices and the MAC address corresponding to the one or more client devices.

On the other hand, if the SSID-password tuple corresponding to the one or more client devices received from cloud platform 606 is a common SSID-common password tuple, Wi-Fi access point 604A authorizes the one or more client devices to access Wi-Fi access point 604A based on the MAC address corresponding to the one or more client devices using MAC address filtering. Wi-Fi access point 604A checks a white list of MAC addresses, wherein the white list contains MAC addresses that are allowed to access Wi-Fi access point 604A. Wi-Fi access point 604A, then, authorizes the one or more client devices to access Wi-Fi access point 604A, if the MAC address corresponding to the one or more client devices is present in the white list.

Figure 7:
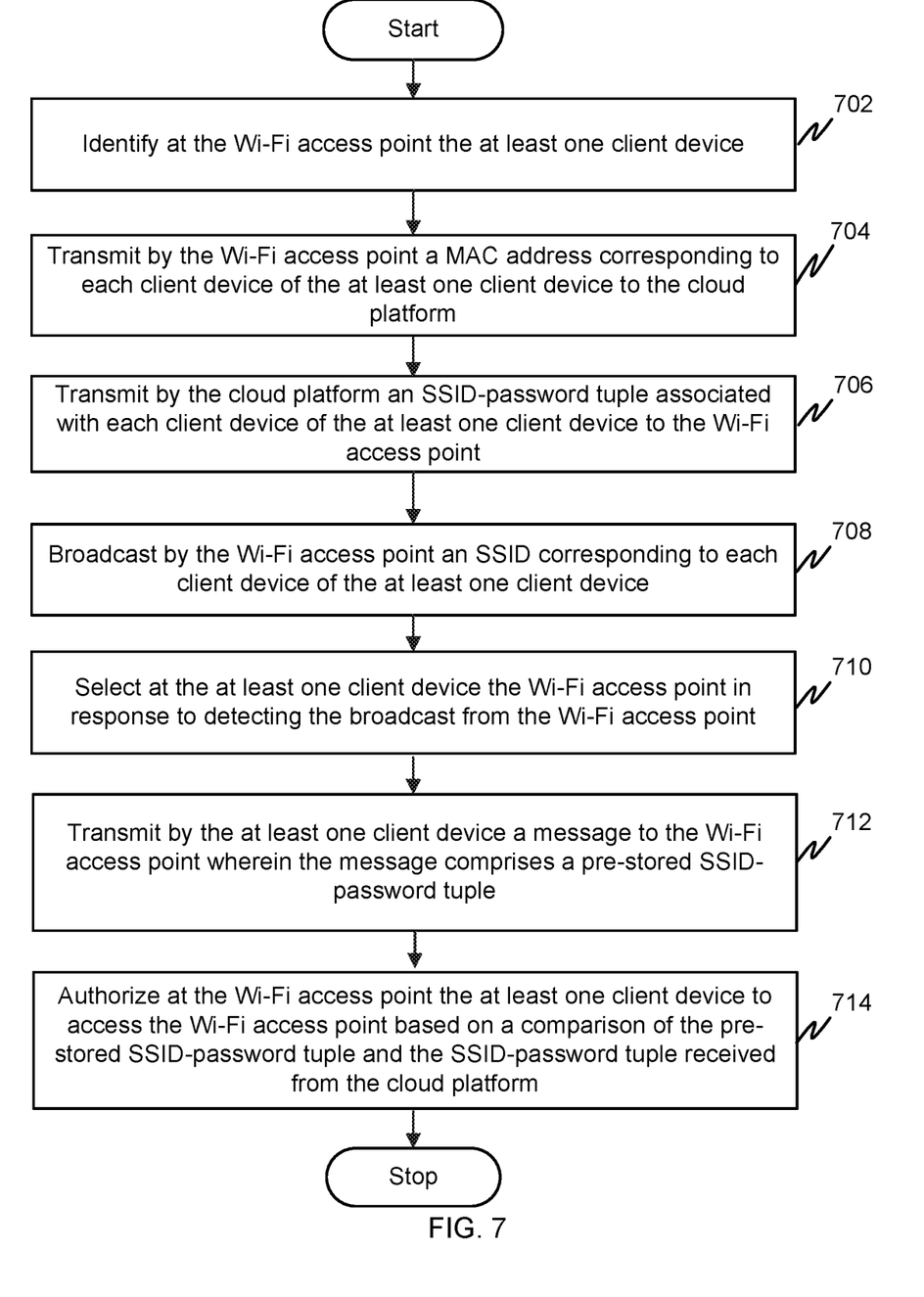
FIG. 7 illustrates a flowchart of a method for establishing a connection between one or more client devices of a plurality of client devices and a Wi-Fi access point of a plurality of Wi-Fi access points using a cloud platform in accordance with another embodiment of the invention.

FIG. 7 illustrates a flowchart of a method for establishing a connection between one or more client devices of plurality of client devices 602A-602N and Wi-Fi access point 604A of plurality of Wi-Fi access points 604A-604N using cloud platform 606 in accordance with another embodiment of the invention.

In order to establish the connection between one or more client devices of plurality of client devices 602A-602N and Wi-Fi access point 604A, at step 702, Wi-Fi access point 604A identifies the one or more client devices. Step 702 is further described in detail in conjunction with FIGS. 8 and 9.

Once the one or more client devices are identified, at step 704, Wi-Fi access point 604A transmits a MAC address corresponding to each client device of the one or more client devices to cloud platform 606.

In response to receiving and identifying the MAC address corresponding to each client device of the one or more client devices, at step 706, cloud platform 606 transmits an SSID-password tuple corresponding to each client device of the one or more client devices to Wi-Fi access point 604A. Cloud platform 606 retrieves the SSID-password tuple corresponding to each client device from tuple database 614.

Tuple database 614 includes a plurality of MAC addresses and plurality of SSID-password tuples associated with plurality of client devices 602A-602N. Each client device is associated with a corresponding MAC address and a corresponding SSID-password tuple. In an embodiment, each MAC address is associated with a unique SSID-password tuple. In another embodiment, a plurality of MAC addresses are associated with a common SSID, however, a unique password is associated with each MAC address of the plurality of MAC addresses (common SSID-unique password tuple). In yet another embodiment, a plurality of MAC addresses are associated with a common SSID and a common password (common SSID-common password tuple). Step 706 is further described in detail in conjunction with FIG. 10.

In an ensuing step 708, Wi-Fi access point 604A broadcasts an SSID corresponding to each client device of the one or more client devices. The SSID broadcast by Wi-Fi access point 604A may be an Open SSID.

Upon detecting the broadcast from Wi-Fi access point 604A, at step 710, the one or more client devices select Wi-Fi access point 604A.

Subsequently, at step 712, the one or more client devices transmit a message to Wi-Fi access point 604A, wherein the message includes a pre-stored SSID-password tuple.

Thereafter, at step 714, the one or more client devices are authorized to access Wi-Fi access point 604A based on a comparison of the pre-stored SSID-password tuple received from the corresponding one or more client devices and the SSID-password tuple corresponding to the one or more client devices received from cloud platform 606.

In an embodiment, if the SSID-password tuple corresponding to the one or more client devices received from cloud platform 606 is a common SSID-unique password tuple, Wi-Fi access point 604A authorizes the one or more client devices to access Wi-Fi access point 604A based on the unique password associated with the one or more client devices and the MAC address corresponding to the one or more client devices.

On the other hand, if the SSID-password tuple corresponding to the one or more client devices received from cloud platform 606 is a common SSID-common password tuple, Wi-Fi access point 604A authorizes the one or more client devices to access Wi-Fi access point 604A based on the MAC address corresponding to the one or more client devices using MAC address filtering. Wi-Fi access point 604A checks a white list of MAC addresses, wherein the white list contains MAC addresses that are allowed to access Wi-Fi access point 604A. Wi-Fi access point 604A, then, authorizes the one or more client devices, to access Wi-Fi access point 604A, if the MAC address corresponding to the one or more client devices is present in the white list.

Figure 8:
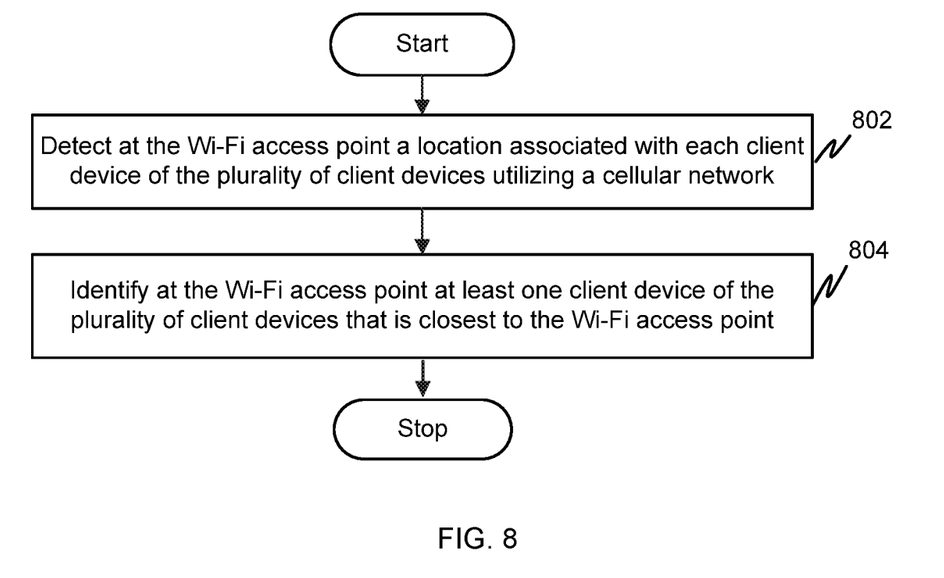
FIG. 8 illustrates a flowchart of a method for identifying one or more client devices at the Wi-Fi access point using a cellular network in accordance with another embodiment of the invention.

FIG. 8 illustrates a flowchart of a method for identifying the one or more client devices at Wi-Fi access point 104A using cellular network 612 in accordance with another embodiment of the invention.

At step 802, Wi-Fi access point 604A detects a location associated with each client device of plurality of client devices 602A-602N utilizing cellular network 612.

Cellular network 612, then, at step 804, identifies one or more client devices of plurality of client devices 602A-602N that are closest to Wi-Fi access point 604A and signals Wi-Fi access point 604A to transmit a MAC address corresponding to the one or more client devices in the vicinity to cloud platform 606.

Figure 9:
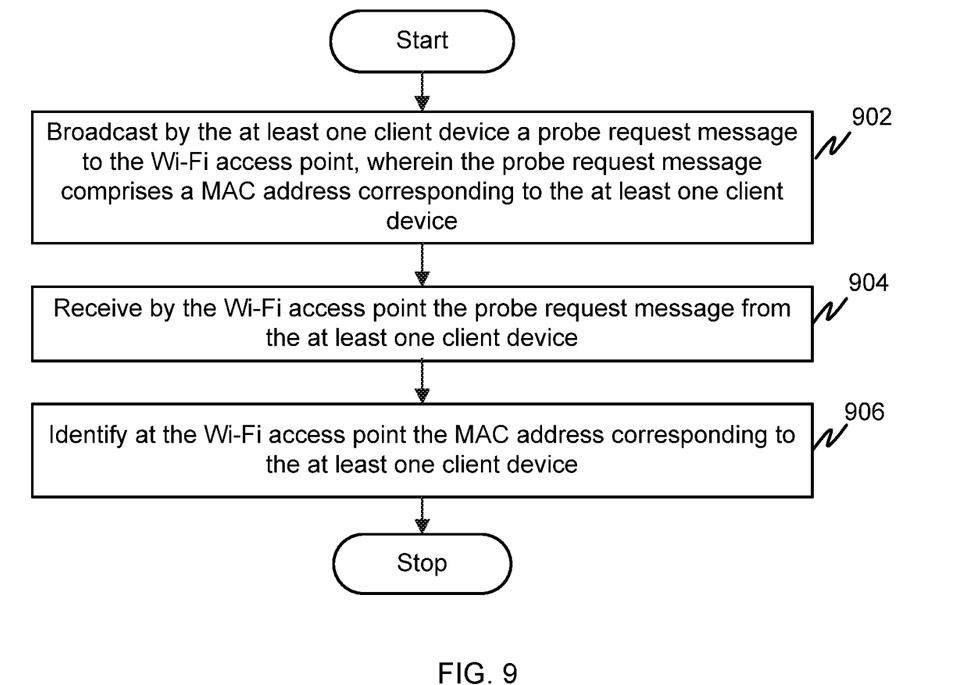
FIG. 9 illustrates a flowchart of a method for identifying one or more client devices at the Wi-Fi access point using MAC address corresponding to the one or more client devices in accordance with another embodiment of the invention.

FIG. 9 illustrates a flowchart of a method for identifying the one or more client devices at Wi-Fi access point 604A using MAC address corresponding to the one or more client devices in accordance with another embodiment of the invention.

At step 902, one or more client devices of plurality of client devices 602A-602N, broadcast a probe request message to Wi-Fi access point 604A, wherein the probe request message includes a MAC address corresponding to the one or more client devices.

Subsequently, at step 904, Wi-Fi access point 604A receives the probe request message from the one or more client devices.

Thereafter, at step 906, Wi-Fi access point 604A identifies the MAC address corresponding to the one or more client devices.

Figure 10:
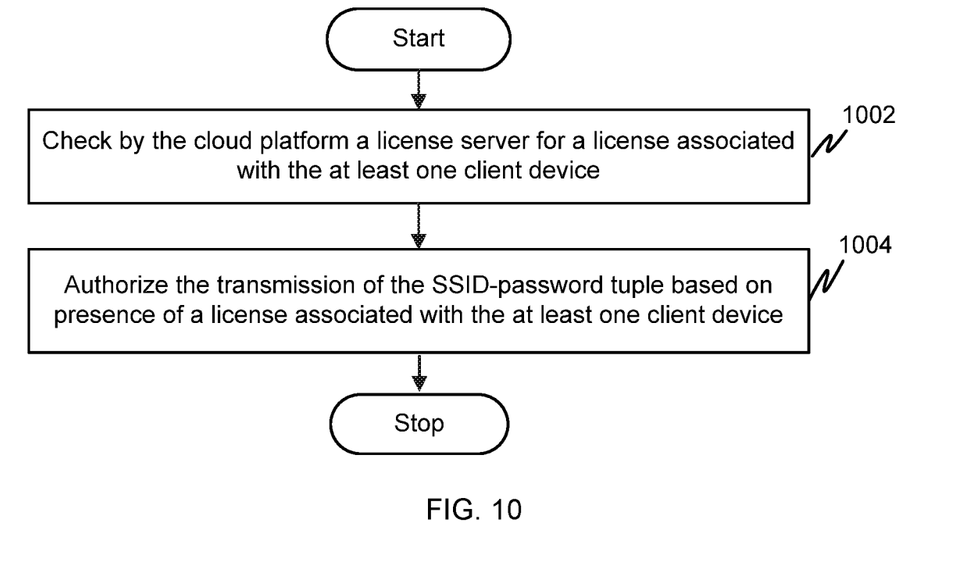
FIG. 10 illustrates a flowchart of a method for authorizing transmission of an SSID-password tuple associated with the one or more client devices from the cloud platform to a Wi-Fi access point using a license server in accordance with another embodiment of the invention.

FIG. 10 illustrates a flowchart of a method for authorizing the transmission of the the SSID-password tuple associated with the one or more client devices from cloud platform 606 to Wi-Fi access point 604A using license server 616 in accordance with another embodiment of the invention.

Prior to transmitting the SSID-password tuple associated with each client device of the one or more client devices to Wi-Fi access point 604A, at step 1002, cloud platform 606 checks license server 616 for a license associated with the one or more client devices.

Thereafter, at step 1004, the transmission of the SSID-password tuple corresponding to the one or more client devices is authorized in response to determining that the one or more client devices have a license. Further, Wi-Fi access point 604A transmits a rejection message to the one or more client devices if the one or more client devices do not have a license.

The invention provides a mechanism which enables faster, seamless connection and authentication of client devices to a Wi-Fi based network architecture utilizing a cloud platform, wherein the cloud platform stores the MAC addresses associated with the client devices and the corresponding SSID-password tuples.

Further, the invention enables a Wi-Fi access point to change the SSIDs transmitted, according to the client devices served by the Wi-Fi access point. As a result, when a client device changes its Wi-Fi access point, the cloud platform pushes the SSID-password tuple associated with the client device to the new Wi-Fi access point. Thus, the invention provides seamless connection during roaming, enabling the client device to connect to a Wi-Fi access point without any interruption.

Also, the invention obviates the need for a client-centric authentication mechanism where the client device has to store all the tuples and has to search for an appropriate tuple and perform internal sorting in order to connect to a Wi-Fi access point. The invention requires only a single tuple to be stored on the client device namely the SSID and password of the client device. Thus, there is no need to search and sort the tuples. Further, the same tuple can be used by more than one client device to create groups or a family.

Further, by utilizing the cloud platform, the invention enables a Wi-Fi access point to transmit either a unique SSID for each client device or a common SSID for all the client devices serviced by the Wi-Fi access point.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for establishing a connection between a client device of a plurality of client devices and a Wi-Fi access point of a plurality of Wi-Fi access points using a cloud platform, comprising:
   identifying, at the cloud platform, at least one target Wi-Fi access point of the plurality of Wi-Fi access points;
   transmitting, by the cloud platform, an SSID-password tuple associated with the client device to the at least one target Wi-Fi access point;
   broadcasting, by the at least one target Wi-Fi access point, an the SSID of the client device;
   selecting, at the client device, a target Wi-Fi access point of the at least one target Wi-Fi access point in response to detecting the broadcast from the at least one target Wi-Fi access point;
   transmitting, by the client device, a message to the target Wi-Fi access point, wherein the message comprises a pre-stored SSID-password tuple;
   authorizing, at the target Wi-Fi access point, the client device to access the target Wi-Fi access point based on a comparison of the pre-stored SSID-password tuple and the SSID-password tuple received from the cloud platform;
   wherein identifying the at least one target Wi-Fi access point at the cloud platform comprises:
   broadcasting, by the client device, a probe request message to at least one Wi-Fi access point of the plurality of Wi-Fi access points, wherein the probe request message comprises a MAC address of the client device;
   receiving, at the at least one Wi-Fi access point, the probe request message from the client device;
   transmitting, by the at least one Wi-Fi access point, a message to the cloud platform, wherein the message comprises the MAC address of the client device; and
   identifying, at the cloud platform, the MAC address corresponding to the at least one Wi-Fi access point in response to receiving the message from the at least one Wi-Fi access point.

2. The method of claim 1, wherein the cloud platform comprises a tuple database which stores a plurality of MAC addresses and a plurality of SSID-password tuples associated with the plurality of client devices, wherein a unique SSID-password tuple is associated with each MAC address of the plurality of MAC addresses.

3. The method of claim 2, wherein a family of client devices are associated with a single SSID-password tuple.

4. The method of claim 1, wherein identifying the at least one target Wi-Fi access point at the cloud platform comprises:
 detecting, at the cloud platform, a location associated with the client device and a location associated with each Wi-Fi access point of the plurality of Wi-Fi access points utilizing a cellular network; and
 identifying, at the cloud platform, the at least one target Wi-Fi access point of the plurality of Wi-Fi access points that is closest to the client device.

5. The method of claim 1, wherein transmitting the MAC address of the client device by the at least one Wi-Fi access point comprises transmitting a plurality of MAC addresses associated with a family of client devices, wherein the family of client devices is predetermined.

6. The method of claim 1, wherein transmitting the SSID-password tuple by the cloud platform comprises:
 checking, by the cloud platform, a license server for a license associated with the client device; and
 authorizing the transmission of the SSID-password tuple based on presence of the license associated with the client device.

7. The method of claim 6 further comprising transmitting, by the Wi-Fi access point, a rejection message for the client device based on a determination that the client device does not have the license.

8. The method of claim 1, wherein broadcasting the SSID of the client device by the at least one target Wi-Fi access point comprises broadcasting an Open SSID associated with the client device.

9. A system for establishing a connection between at least one client device of a plurality of client devices and a Wi-Fi access point of a plurality of Wi-Fi access points using a cloud platform, wherein a client device of the plurality of client devices is associated with a MAC address, the system comprising:
 one or more memories;
 one or more processors communicatively coupled to the one or more memories, wherein the one or more processors are configured to:
 identify, at the Wi-Fi access point, the at least one client device;
 transmit, by the Wi-Fi access point, a MAC address corresponding to each client device of the at least one client device to the cloud platform;
 transmit, by the cloud platform, an SSID-password tuple associated with each client device of the at least one client device to the Wi-Fi access point;
 broadcast, by the Wi-Fi access point, an SSID corresponding to each client device of the at least one client device;
 select, at the at least one client device, the Wi-Fi access point in response to detecting the broadcast from the Wi-Fi access point;
 transmit, by the at least one client device, a message to the Wi-Fi access point, wherein the message comprises a pre-stored SSID-password tuple;
 authorize, at the Wi-Fi access point, the at least one client device to access the Wi-Fi access point based on a comparison of the pre-stored SSID-password tuple and the SSID-password tuple received from the cloud platform;

wherein the one or more processors are configured to identify the at least one target Wi-Fi access point at the cloud platform by
 broadcasting, by the at least one client device, a probe request message to the Wi-Fi access point, wherein the probe request message comprises the MAC address corresponding to the at least one client device;
 receiving, by the Wi-Fi access point, the probe request message from the at least one client device; and
 identifying, at the Wi-Fi access point, the MAC address corresponding to the at least one client device.

10. The system of claim 9, wherein the cloud platform comprises a tuple database which stores a plurality of MAC addresses and a plurality of SSID-password tuples associated with the plurality of client devices.

11. The system of claim 10, wherein a family of client devices are associated with a single SSID-password tuple.

12. The system of claim 9, wherein the one of more processors are configured to:
 detect, at the Wi-Fi access point, a location associated with each client device of the plurality of client devices utilizing a cellular network; and
 identify, at the Wi-Fi access point, at least one client device of the plurality of client devices that is closest to the Wi-Fi access point.

13. The system of claim 9, wherein the one of more processors are configured to:
 check, by the cloud platform, a license server for a license associated with the at least one client device; and
 authorize the transmission of the SSID-password tuple based on presence of the license associated with the at least one client device.

14. The system of claim 13 wherein the one of more processors are configured to transmit, by the Wi-Fi access point, a rejection message for the at least one client device based on a determination that the at least one client device does not have the license.

15. The system of claim 9, wherein the one of more processors are configured to broadcast an Open SSID corresponding to each client device of the at least one client device.

16. The system of claim 9, wherein the SSID-password tuple is one of a common SSID-unique password tuple and a common SSID-common password tuple.

17. The system of claim 16, wherein the one of more processors are configured to authorize, at the Wi-Fi access point, the at least one client device to access the Wi-Fi access point based on a unique password associated with each client device of the at least one client device and the MAC address corresponding to each client device of the at least one client device, wherein the SSID-password tuple is a common SSID-unique password tuple.

18. The system of claim 16, wherein the one of more processors are configured to authorize, at the Wi- Fi access point, the at least one client device to access the Wi-Fi access point based on the MAC address corresponding to each client device of the at least one client device using MAC address filtering, wherein the SSID-password tuple is a common SSID-common password tuple.

\* \* \* \* \*